United States Patent
Manring

(10) Patent No.: US 6,445,990 B1
(45) Date of Patent: Sep. 3, 2002

(54) METHOD AND APPARATUS FOR CONTROLLING STRAIGHT LINE TRAVEL OF A TRACKED MACHINE

(75) Inventor: Noah Manring, Columbia, MO (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/811,921

(22) Filed: Mar. 19, 2001

(51) Int. Cl.⁷ ............................. G06F 7/00; G06F 17/40; G06F 19/00
(52) U.S. Cl. ...................... 701/50; 114/144 R; 701/41; 180/168
(58) Field of Search ...................... 701/50, 41; 180/168, 180/6.2, 6.7; 114/144 R

(56) References Cited

U.S. PATENT DOCUMENTS

| | | | |
|---|---|---|---|
| 4,533,998 A | 8/1985 | Falamak | |
| 4,700,302 A | * 10/1987 | Arakawa et al. | ............ 180/168 |
| 5,307,888 A | 5/1994 | Urvoy | |
| 5,313,397 A | 5/1994 | Singh et al. | |
| 5,404,087 A | * 4/1995 | Sherman | ..................... 180/168 |
| 5,462,122 A | 10/1995 | Yamamoto | |
| 5,632,217 A | 5/1997 | Ford et al. | |
| 5,862,501 A | 1/1999 | Talbot et al. | |
| 5,928,309 A | 7/1999 | Korver et al. | |
| 5,934,407 A | 8/1999 | Shimizu et al. | |
| 6,102,330 A | * 8/2000 | Burken et al. | .............. 244/184 |

* cited by examiner

Primary Examiner—William A. Cuchlinski, Jr.
Assistant Examiner—Olga Hernandez
(74) Attorney, Agent, or Firm—Steve D. Lundquist

(57) ABSTRACT

A method and apparatus for controlling straight line travel of a tracked machine having a left track and a right track. The method and apparatus includes initiating a straight line travel mode of the tracked machine, determining an initial heading angle of a heading sensor located on the tracked machine, sensing a deviation in heading angle from the initial heading angle as the tracked machine travels, determining a heading angle error in response to the deviation in heading angle, and adjusting the speed of at least one of the left and right tracks to compensate for the heading angle error.

14 Claims, 5 Drawing Sheets

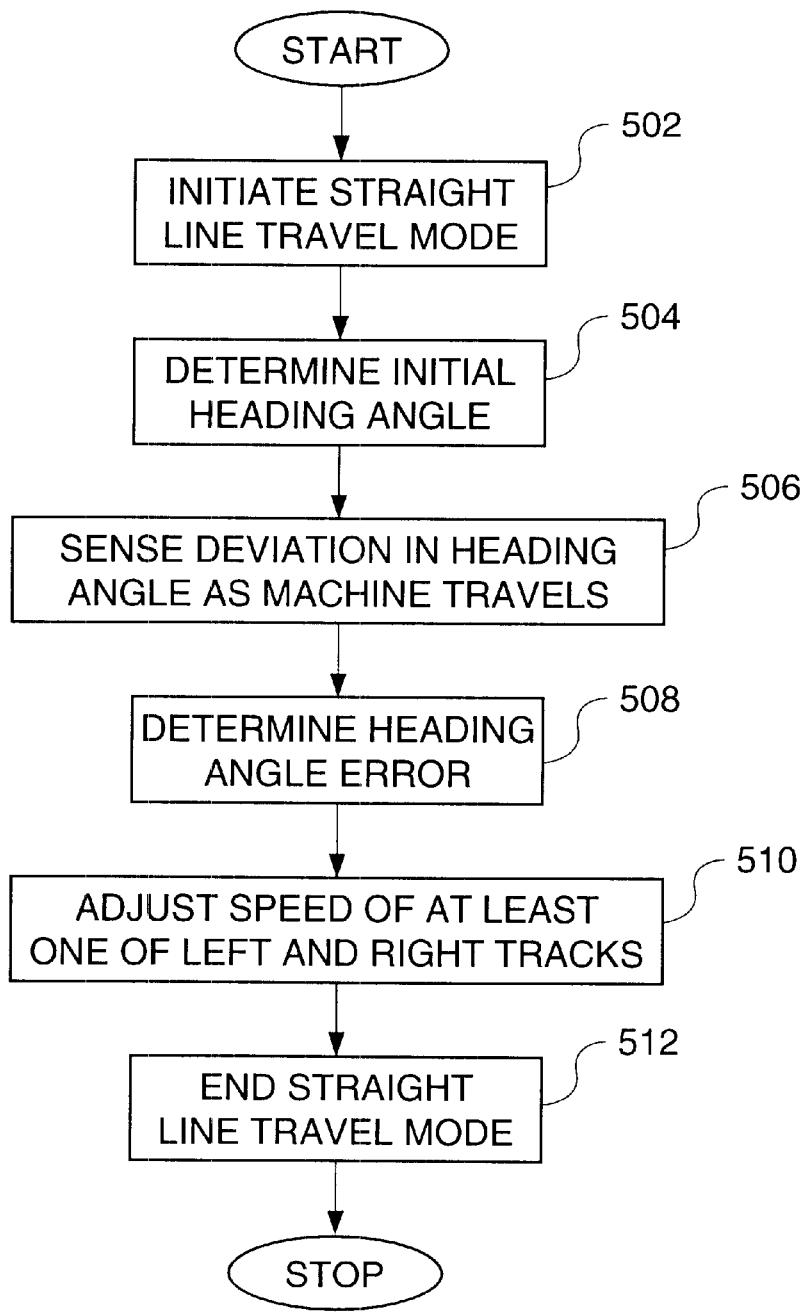

METHOD AND APPARATUS FOR CONTROLLING STRAIGHT LINE TRAVEL OF A TRACKED MACHINE

TECHNICAL FIELD

This invention relates generally to a method and apparatus for controlling the steering of a tracked machine and, more particularly, to a method and apparatus for controlling the direction of a tracked machine as the machine travels on a straight line path.

BACKGROUND

Tracked machines, such as track-type tractors, skid steer loaders, and the like, are used to perform a variety of work functions under conditions which require an amount of traction not available with conventional wheeled machines. The tracked machines typically are driven by some type of differential transmission system, which applies the driving force to each of a left and a right track. Generally, the tracked machines are steered by controlling the speed of each track; that is, if it is desired to turn to the left, the left track is made to move slower compared to the right track to effectuate the turn. If it is desired to move the tracked machine along a straight line path, i.e., straight tracking the machine, both tracks are made to move at equal speeds.

A problem that exists, however, is that it is often difficult, if not impossible, to keep both tracks at the same speed, particularly under load conditions. One track may periodically slip, thus causing the machine to deviate from its straight line path. An operator must constantly be aware of this situation, and must frequently make steering corrections to keep the machine traveling in the desired direction.

A common method employed to monitor straight tracking of a tracked machine, and possibly provide automated steering adjustments, is to employ speed sensors at each track to sense any speed differentials between tracks. However, this requires two sensors, which must be installed at locations which are highly prone to adverse conditions, such as dirt, mud, rocks, and the like. Consequently, inaccuracies and even failure of these speed sensors are fairly common.

The present invention is directed to overcoming one or more of the problems as set forth above.

SUMMARY OF THE INVENTION

In one aspect of the present invention a method for controlling straight line travel of a tracked machine having a left track and a right track is disclosed. The method includes the steps of initiating a straight line travel mode of the tracked machine, determining an initial heading angle of a heading sensor located on the tracked machine, sensing a deviation in heading angle from the initial heading angle as the tracked machine travels, determining a heading angle error in response to the deviation in heading angle, and adjusting the speed of at least one of the left and right tracks to compensate for the heading angle error. In another aspect of the present invention an apparatus for automatically controlling straight line travel of a tracked machine having a left track and a right track is disclosed. The apparatus includes a steering control mechanism located on the tracked machine for initiating a straight line travel mode in response to being set to a neutral position, a heading sensor located on the tracked machine for determining an initial heading angle of the tracked machine in response to initiation of the straight line travel mode, and for determining a deviation in heading angle from the initial heading angle as the tracked machine travels, and a controller located on the tracked machine for determining a heading angle error in response to the deviation in heading angle, and for adjusting the speed of at least one of the left and right tracks to compensate for the heading angle error.

BRIEF DESCRIPTION OF THE DRAWINGS

FIG. 5 is a flow diagram illustrating a preferred method of the present invention.

DETAILED DESCRIPTION

Figure 1:
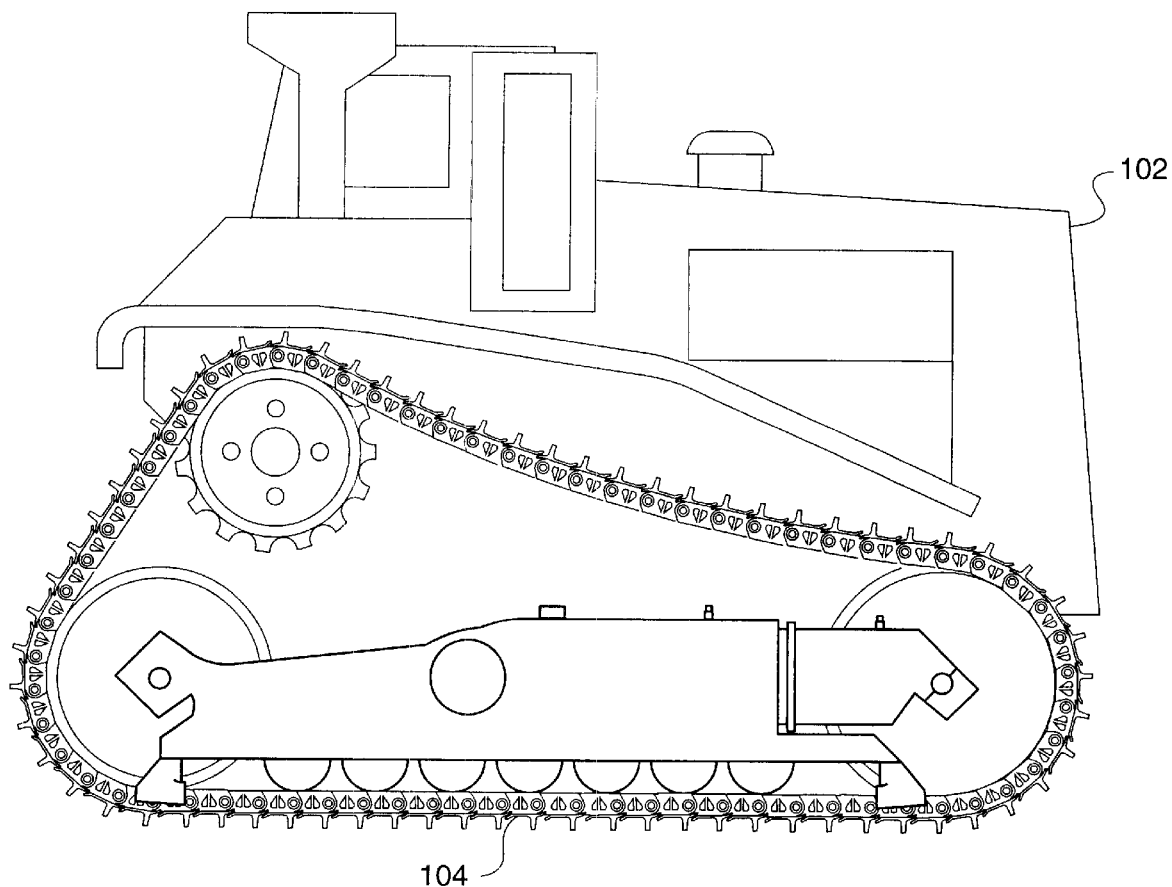
FIG. 1 is a diagrammatic illustration of a tracked machine suitable for use with the present invention.

Referring to the drawings, a method and apparatus 100 for automatically controlling straight line travel of a tracked machine 102 having a left track 104-L and a right track 104-R is shown.

For example, as exemplified in FIG. 1, the tracked machine 102 is depicted as a track-type tractor, suitable for use in a number of earthworking operations, such as mining, construction, and the like. However, other types of tracked machines could also be used with the present invention, such as, but not limited to, skid-steer loaders, tracked loaders, excavators, and agricultural tracked machines.

Tracked machines 102 offer the advantage of increased traction in difficult terrain, and in some instances reduced compression of the soil which is traveled upon. However, tracked machines 102 present challenges not normally encountered with wheeled machines, particularly with steering of the machine. A tracked machine 102 typically is steered by varying the speed of the left track 104-L as compared to the speed of the right track 104-R, thus causing the tracked machine to turn in one or the other direction.

Figure 2:
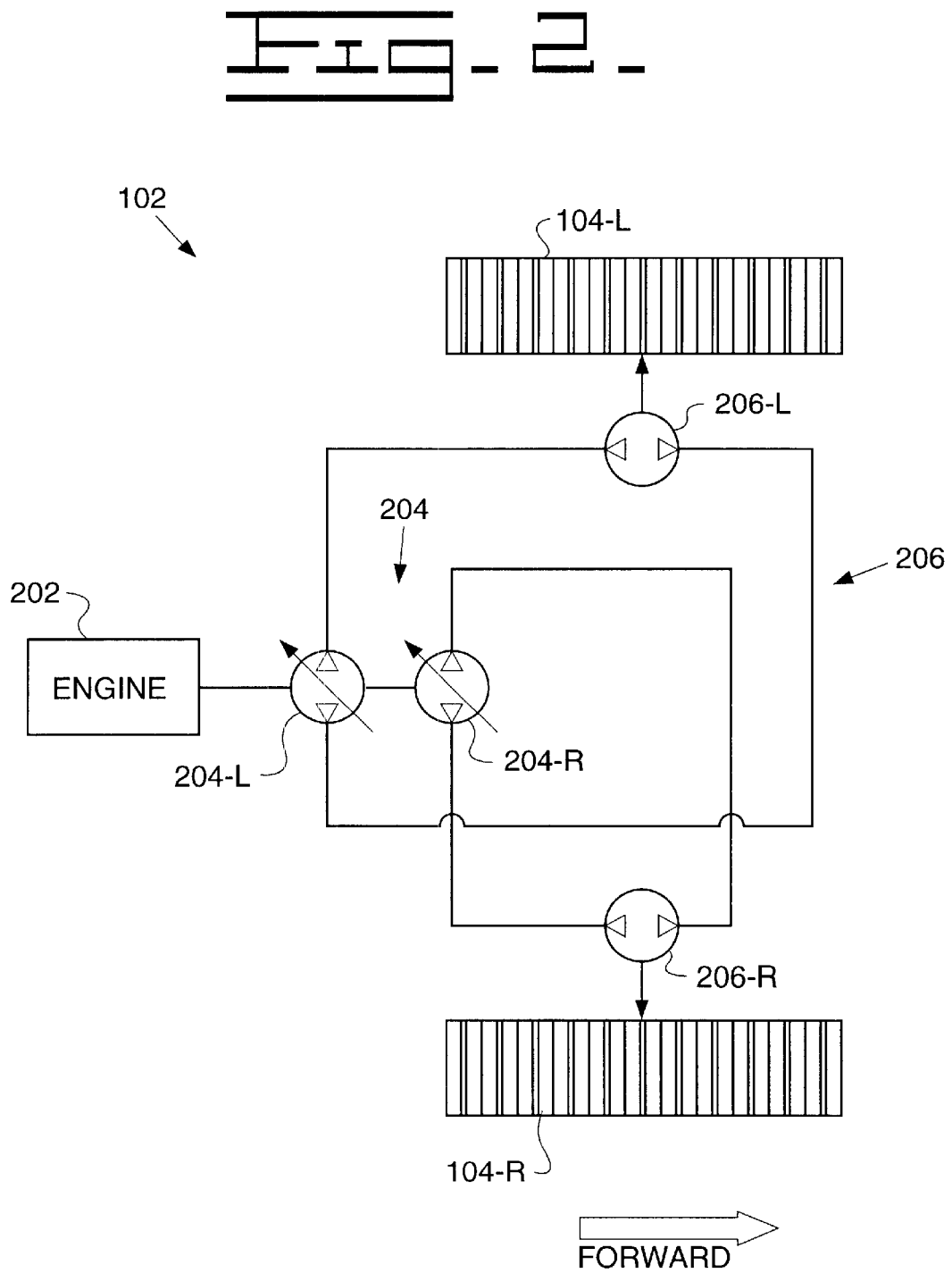
FIG. 2 is a block diagram illustrating an exemplary drive transmission for a tracked machine.

An example of a drive transmission for a tracked machine 102 is shown in FIG. 2. In this example, an engine 202 provides power to the tracks 104. The distribution of power is controlled by pumps 204 and motors 206. More specifically, a left pump 204-L, preferably hydraulic, drives a left motor 206-L, which in turn propels the left track 104-L. In like manner, a right pump 204-R drives a right motor 206-R, which in turn propels the right track 104-R. The speed of rotation of the left and right motors 206-L, 206-R determine the speed of the respective left and right tracks 104-L,104-R. This type of drive transmission is known in the art as a dual-path hydrostatic transmission, and is particularly suited for use with the present invention.

Other types of drive transmissions, however, may also benefit from the present invention. For example, other types of transmissions for tracked machines include, but are not limited to, a mechanical transmission having a clutch and gear system (not shown), a hydro-mechanical transmission, e.g., a split-torque transmission (not shown), and a hydro-kinetic transmission having a torque converter system (not shown). These alternate transmission types are all well known in the art and are not discussed further.

Figure 3:
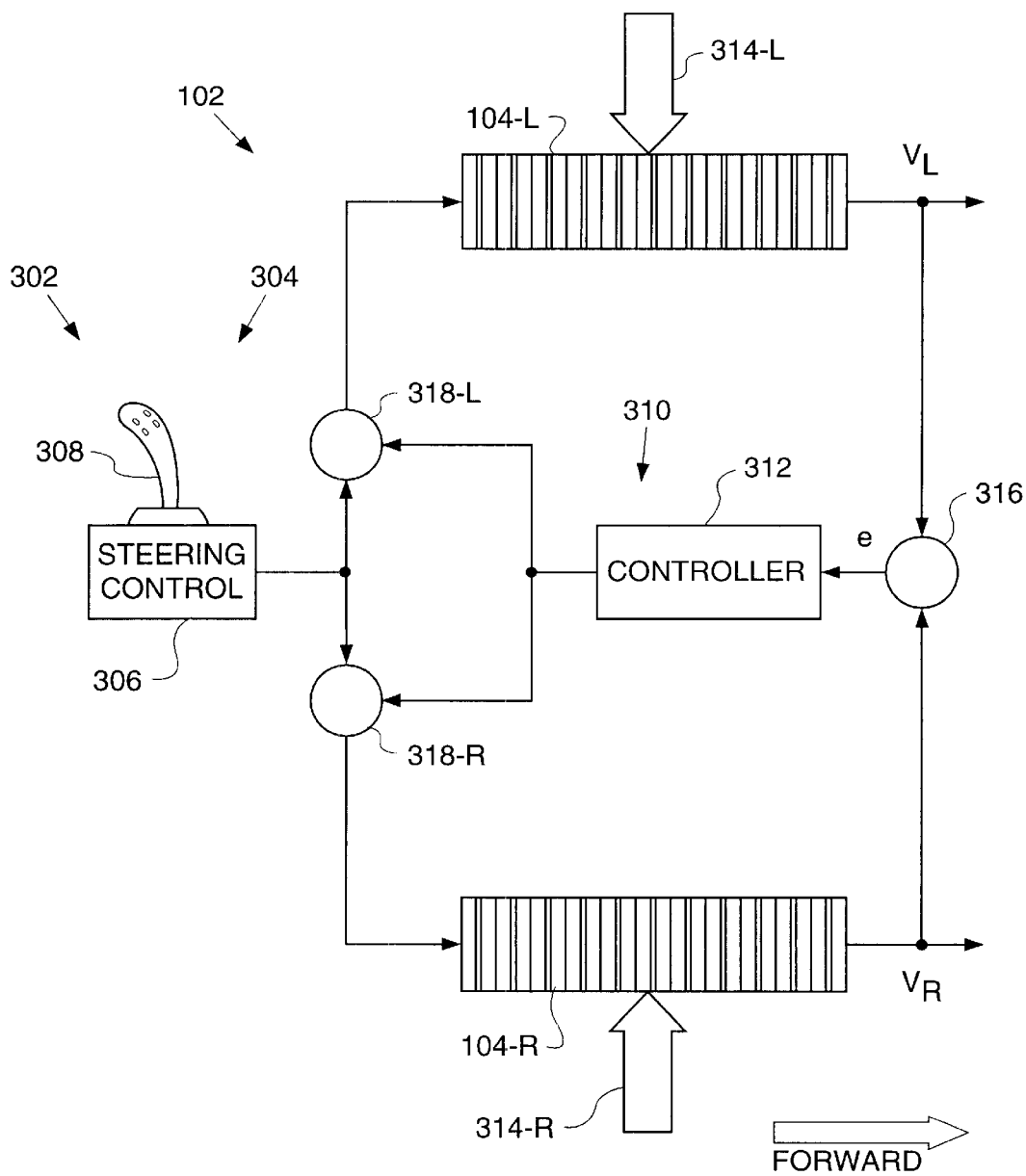
FIG. 3 is a block diagram illustrating a method for controlling straight line travel of a tracked machine by monitoring output speeds of each track.

Referring to FIG. 3, a method typically used to control the tracked machine 102 during straight line travel is shown. Straight line travel is often desired of a tracked machine 102. For example, a common function of a track-type tractor is to dig into the soil and push, i.e., carry, the soil a desired distance before unloading it. During this process, it is desired to travel in a straight line path. However, an operator must continually compensate steering of the track-type tractor due to slippage of the tracks. For example, as FIG. 3 illustrates, a left track ground reaction load 314-L is applied to the left track 104-L and a right track ground reaction load 314-R is applied to the right track 104-R. The left and right track ground reaction loads 314-L,314-R are indicative of torques being applied to the respective left and right tracks 104-L,104-R from engagement with the ground, and differ from each other from time to time. For example, one of the tracks 104 may engage loose soil, thus causing that track 104 to slip, while the other track 104 does not slip. The slippage of one track 104 causes that track 104 to move faster than the other track 104, thus resulting in a speed differential between tracks 104. This speed differential causes the tracked machine 102 to turn from the desired straight line path. For example, if the left track 104-L slips and the right track 104-R does not slip, the left track 104-L moves faster than the right track 104-R. However, the movement of the left track 104-L, due to slippage, does not propel the tracked machine 102 efficiently, and the tracked machine 102 steers to the left.

One technique used to compensate for the above steering situation is to monitor the speeds $V_L$ and $V_R$ of the respective left and right tracks 104L, 104-R, and deliver the monitored speeds to a controller 312 by way of a track output summer 316, as shown in FIG. 3. An error signal e, which corresponds to the difference between $V_L$ and $V_R$, is used by the controller 312 to determine what steering correction might be needed. The controller 312 then delivers correction signals, by way of left and right track steering control summers 318-L,318-R, to signals generated by a steering control 306, to responsively compensate for changes in steering from the desired straight line path.

The technique of FIG. 3 typically uses speed sensors (not shown) to sense the speed of either the left and right tracks 104-L,104-R, or the motors 206 which drive the tracks 104. These sensors add to the overall costs of the tracked machine 102, and usually are prone to damage by the harsh environments typically experienced by the tracked machine 102.

Figure 4:
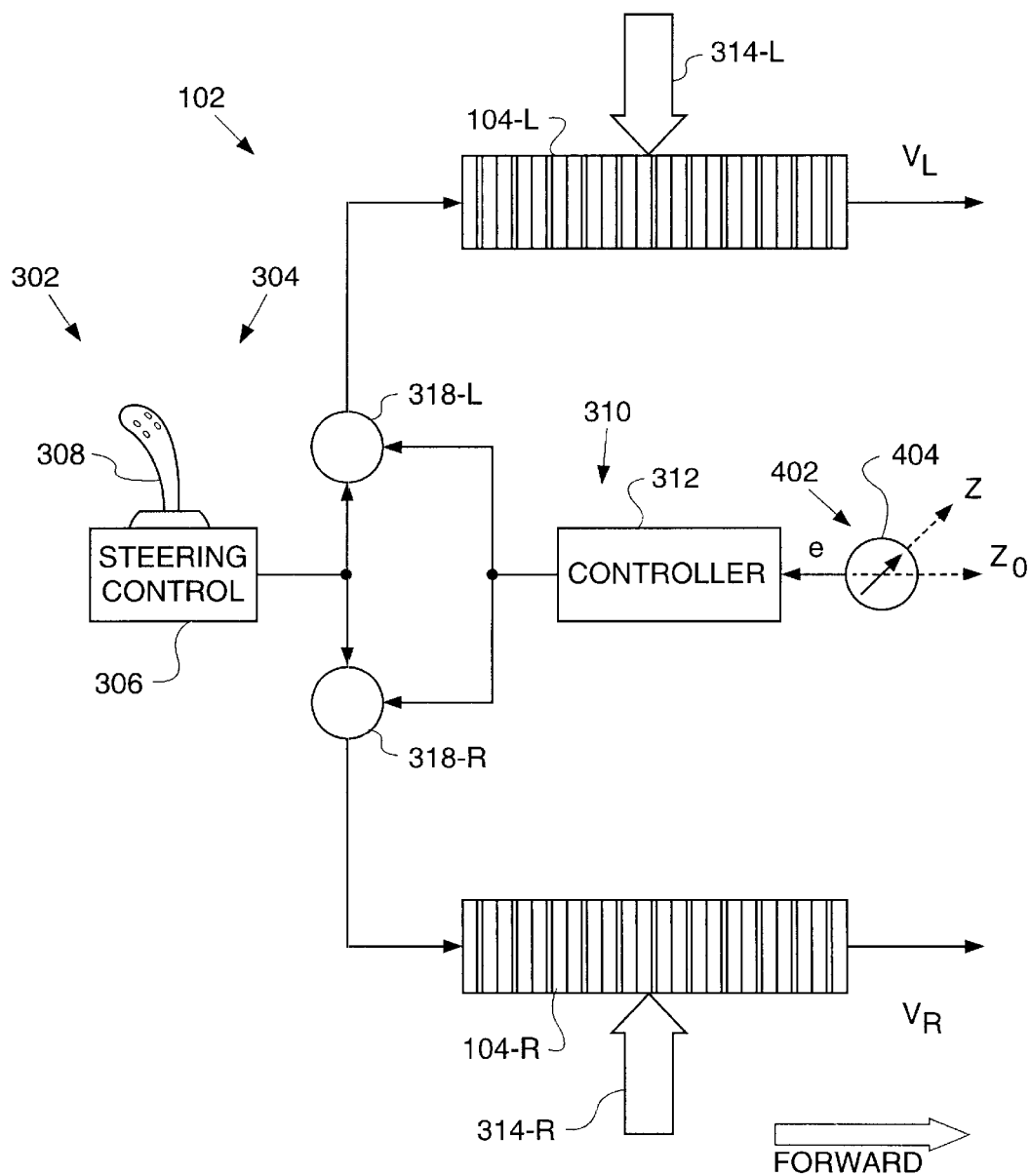
FIG. 4 is a block diagram illustrating a method for controlling straight line travel of a tracked machine as depicted by a preferred embodiment of the present invention.

FIG. 4 illustrates a preferred embodiment of the present invention and is discussed below with respect to the flow diagram of FIG. 5.

In a first control block 502 in FIG. 5, a straight line travel mode is initiated. In the preferred embodiment, a means 302 for initializing straight line travel mode is located on the tracked machine 102 and is controlled by an operator of the tracked machine 102. For example, the steering control 306 typically includes a steering control mechanism 308, such as a joystick. When the steering control mechanism 308 is placed in a neutral position, e.g., released by the operator in the neutral position, the straight line travel mode is initiated.

In a second control block 504, a heading sensor 402 senses the heading of the tracked machine 102 at the time the straight line travel mode is initiated. An initial heading angle is determined based on the initial heading of the tracked machine 102. For example, in FIG. 4, the initial heading angle is depicted as $Z_0$. The initial heading angle is used as a reference angle for the tracked machine 102 as the straight line path is traveled.

In a third control block 506, any deviation from the initial heading angle is sensed by the heading sensor 402 as the tracked machine 102 travels the straight line path. In FIG. 4, a deviation from the initial heading angle is denoted as Z.

Preferably, the heading sensor 402 is a compass 404, such as a digital compass, suitable for determining a heading angle and producing a signal indicative of the heading angle. The compass 404 may be located on the tracked machine 102 in virtually any location, thus allowing installation in an area that is easily accessible and relatively free from harsh environmental conditions.

In a fourth control block 508, a heading angle error is determined in response to the deviation in heading angle. In FIG. 4, the heading angle error is shown as e, and is the difference between Z and $Z_0$. In the preferred embodiment, the controller 312 continuously receives heading information from the compass 404, and responsively determines $Z_0$, Z, and e. Alternatively, however, the heading sensor 402 may include a microprocessor (not shown), and may determine e directly and deliver an error signal to the controller 312.

In a fifth control block 510, the controller 312 delivers a control signal which adjusts the speed of at least one of the left and right tracks 104-L,104-R in response to the error signal. As FIG. 4 illustrates, the control signal is delivered to left and right track steering control summers 318-L,318-R. The control signal is then summed with the signal from the steering control 306, and the speed of one of the tracks 104 is adjusted relative to the other track 104 to maintain the desired straight line path.

In a sixth control block 512, the straight line travel mode is ended in response to activation of the means 304 for ending straight line travel mode. In the preferred embodiment, the means 304 for ending straight line travel mode is accomplished by moving the steering control mechanism 308 out of the neutral position, e.g., movement of the steering control mechanism 308 by the operator of the tracked machine 102.

It is noted that, in the preferred embodiment, the controller 312 includes the means 310 for determining the initial heading angle $Z_0$, the means 310 for sensing any deviation in heading angle Z, the means 310 for determining a heading angle error e, and the means 310 for adjusting the speed of the tracks 104.

INDUSTRIAL APPLICABILITY

As an example of an application of the present invention, an operator of a tracked machine 102, such as a track-type tractor, may periodically desire to travel along a straight line path. However, the loads being placed on the tracked machine 102, and in particular the tracks 104 tend to cause the tracked machine 102 to deviate from the straight line path, requiring constant monitoring and steering adjustments by the operator. Over the course of a long period of time, this constant attention to steering fatigues the operator, which may result in operator error. The present invention provides a cost efficient and reliable method to perform the monitoring and steering corrections, thus freeing up the operator to focus on other aspects of the task.

As another example of an application of the present invention, a tracked machine 102, as it first starts to move, commonly deviates immediately from the desired direction of travel due to one track 104 lurching ahead of the other track 104. This phenomenon, known as tractor indexing, is particularly troublesome in that an operator may easily be caught off guard. For example, tractor indexing may occur when the tracked machine 102 is being loaded onto or unloaded from a trailer. The present invention is suitable for monitoring and controlling straight line steering of the tracked machine 102 as it starts to move, thus alleviating the problem of tractor indexing. Other aspects, objects, and features of the present invention can be obtained from a study of the drawings, the disclosure, and the appended claims.

What is claimed is:

1. A method for automatically controlling straight line travel of a tracked machine having a left track and a right track, including the steps of:

initiating a straight line travel mode of the tracked machine;

determining an initial heading angle of a heading sensor located on the tracked machine;

sensing a deviation in heading angle from the initial heading angle as the tracked machine travels;

determining a heading angle error in response to the deviation in heading angle; and adjusting the speed of at least one of the left and right tracks to compensate for the heading angle error.

2. A method, as set forth in claim 1, wherein determining an initial heading angle of a heading sensor includes the step of determining an initial heading angle of a compass, and wherein sensing a deviation in heading angle includes the step of sensing a deviation in the heading angle of the compass.

3. A method, as set forth in claim 1, wherein initiating a straight line travel mode of the tracked machine includes the step of setting a steering control mechanism to a neutral position.

4. A method, as set forth in claim 3, further including the step of ending the straight line travel mode of the tracked machine in response to the steering control mechanism being moved out of the neutral position.

5. An apparatus for automatically controlling straight line travel of a tracked machine having a left track and a right track, comprising:

means for initiating a straight line travel mode of the tracked machine;

means for determining an initial heading angle of a heading sensor located on the tracked machine;

means for sensing a deviation in heading angle from the initial heading angle as the tracked machine travels;

means for determining a heading angle error in response to the deviation in heading angle; and means for adjusting the speed of at least one of the left and right tracks to compensate for the heading angle error.

6. An apparatus, as set forth in claim 5, wherein the heading sensor includes a compass.

7. An apparatus, as set forth in claim 5, wherein the means for initiating a straight line travel mode of the tracked machine includes a steering control mechanism being set to a neutral position.

8. An apparatus, as set forth in claim 7, further including means for ending the straight line travel mode of the tracked machine.

9. An apparatus, as set forth in claim 8, wherein the means for ending the straight line travel mode of the tracked machine includes the steering control mechanism being moved out of the neutral position.

10. An apparatus for automatically controlling straight line travel of a tracked machine having a left track and a right track, comprising:

a steering control mechanism located on the tracked machine for initiating a straight line travel mode in response to being set to a neutral position;

a heading sensor located on the tracked machine for determining an initial heading angle of the tracked machine in response to initiation of the straight line travel mode, and for determining a deviation in heading angle from the initial heading angle as the tracked machine travels; and a controller located on the tracked machine for determining a heading angle error in response to the deviation in heading angle, and for adjusting the speed of at least one of the left and right tracks to compensate for the heading angle error.

11. An apparatus, as set forth in claim 10, wherein the heading sensor includes a compass.

12. An apparatus, as set forth in claim 10, wherein the steering control mechanism is further adapted to end the straight line travel mode of the tracked machine in response to the steering control mechanism being moved out of the neutral position.

13. A method for automatically controlling straight line travel of a tracked machine having a left track and a right track, including the steps of:

initiating a straight line travel mode of the tracked machine in response to setting a steering control mechanism to a neutral position;

determining an initial heading angle of a compass located on the tracked machine;

sensing a deviation in heading angle from the initial heading angle as the tracked machine travels;

determining a heading angle error in response to the deviation in heading angle;

adjusting the speed of at least one of the left and right tracks to compensate for the heading angle error; and ending the straight line travel mode of the tracked machine in response to the steering control mechanism being moved out of the neutral position.

14. An apparatus for automatically controlling straight line travel of a tracked machine having a left track and a right track, comprising:

a steering control mechanism located on the tracked machine for initiating a straight line travel mode in response to being set to a neutral position, and for ending the straight line travel mode of the tracked machine in response to the steering control mechanism being moved out of the neutral position;

a compass located on the tracked machine for determining an initial heading angle of the tracked machine in response to initiation of the straight line travel mode, and for determining a deviation in heading angle from the initial heading angle as the tracked machine travels; and a controller located on the tracked machine for determining a heading angle error in response to the deviation in heading angle, and for adjusting the speed of at least one of the left and right tracks to compensate for the heading angle error.

* * * * *